United States Patent
Andresen et al.

(10) Patent No.: US 6,348,774 B1
(45) Date of Patent: Feb. 19, 2002

(54) METHOD FOR CONTROLLING SEVERAL STEPPING MOTOR MODULES WITH PRIOR LOADING OF RAMP DATA

(75) Inventors: Hermann Andresen, Weidenbach; Reinhold Rigauer, Erding, both of (DE)

(73) Assignee: Océ Printing Systems GmbH, Poing (DE)

(*) Notice: Subject to any disclaimer, the term of this patent is extended or adjusted under 35 U.S.C. 154(b) by 0 days.

(21) Appl. No.: 09/600,034
(22) PCT Filed: Jan. 29, 1999
(86) PCT No.: PCT/EP99/00591
§ 371 Date: Oct. 2, 2000
§ 102(e) Date: Oct. 2, 2000
(87) PCT Pub. No.: WO99/39250
PCT Pub. Date: Aug. 5, 1999

(30) Foreign Application Priority Data

Jan. 29, 1998 (DE) .......................... 198 03 417

(51) Int. Cl.[7] .............. H02P 7/68; H02P 8/00
(52) U.S. Cl. .......... 318/685; 318/696; 318/49; 318/113
(58) Field of Search ............. 318/696, 587, 318/139, 685

(56) References Cited

U.S. PATENT DOCUMENTS

| | | |
|---|---|---|
| 4,369,402 A | 1/1983 | Gabor et al. |
| 4,568,866 A | 2/1986 | Floro et al. |
| 4,689,541 A * | 8/1987 | Jones et al. |
| 4,825,133 A * | 4/1989 | Tanuma et al. ............ 318/113 |
| 4,918,365 A * | 4/1990 | Tanuma et al. ............ 318/685 |
| 5,508,596 A | 4/1996 | Olsen |

FOREIGN PATENT DOCUMENTS

| | | |
|---|---|---|
| DE | 25 11 640 | 9/1976 |
| DE | 39 15 576 | 11/1989 |
| DE | 39 28 451 | 7/1991 |
| DE | 42 17 556 | 2/1993 |
| EP | 0 581 300 | 2/1994 |
| WO | WO 96/09611 | 3/1996 |
| WO | WO 96/37862 | 11/1996 |
| WO | WO 98/18060 | 4/1998 |

OTHER PUBLICATIONS

Dan Teodorescu—Optimierte Schrittmotorantriebe—1990.
Servotechnik—Servoantriebe–vom einfachen Steller zum intelligenten Systembaustein—Aug. 14, 1996.
Christopher F. Edwards, et al., "A Multibit ΣΔModulator in Floating–Body SOS/SOI CMOS for Extreme Radiation Environments", IEEE Journal of Solid–State Circuits, vol. 34, No. 7, Jul. 1999.

* cited by examiner

Primary Examiner—Paul Ip
(74) Attorney, Agent, or Firm—Schiff Hardin & Waite

(57) ABSTRACT

In a method and device for controlling several stepping motor modules in printing or copying machines, sets of ramp data are centrally calculated in a computer in a calculation phase and are transmitted via a bus system to one logic unit each in a loading phase. The ramp data are stored in the stepping motor modules in non-volatile memories and are loaded to corresponding main memories depending on operating conditions. When a stepping motor module is operational, the current set of ramp data is transmitted by a control unit. A start signal transmitted by the control unit initiates the conversion of the set of ramp data selected in the corresponding logic unit into impulses of variable distance.

16 Claims, 5 Drawing Sheets

METHOD FOR CONTROLLING SEVERAL STEPPING MOTOR MODULES WITH PRIOR LOADING OF RAMP DATA

BACKGROUND OF THE INVENTION

The invention relates to a method for controlling several stepping motor modules in which each respective power unit of the step motor modules supplies at least one step motor with current impulses, with the step motor being advanced one step by each current impulse. A power unit receives impulses that are separated in time from a logic assembly, the edges of which pulses generate a current pulse in the power unit and the interval of which relative to the previous pulse is acquired from a set of ramp data. Furthermore, the invention relates to a device for carrying out the method.

Stepping motor modules are used particularly in printing and copying devices to drive transport drums, which transport the paper or forms that are to be printed through the printing or copying device. WO 98/18060 A1 describes a printing device, for example.

The stepping motors in printers or copiers are accelerated or braked according to a prescribed rate-of-rotationspeed curve. This speed/time curve for acceleration is also called a ramp. To control the running up and braking of the stepping motor, the possibility exists for a device control to supply the logic assembly with the required ramp data continuously. This type of system is described in Teodorescu, EMA 90/4, s. 106–109 (FIG. 3). A similar system is known from De 25 11 640 A. In these types of systems, when a plurality of ramp data requires a transfer in real time, the technical expense that is required for this, both on the device control side and the stepping motor module side, rises significantly. Another problem arises when the ramp data are supplied via a bus system. Since the bus system has fluctuating reaction times, it is not guaranteed that the ramp data that are output the device control are converted into the required rotation steps for the stepping motor with ever more constant delay. Rather, this delay depends on the current usage of the bus system, so that the step motor is not run up and braked precisely to the prescribed ramp. This problem has a particularly adverse effect when several stepping motor modules are supplied with ramp data by the device control unit, and the relevant stepping motor has to follow identical ramps in order to provide identical transport speeds.

The article "Servoantriebe—vom einfachen Steller zum intelligente Systembaustein" (Weidauer, AGT 4/96, pp. 14–18) and DE 39 28 451 A1 teach stepping motor systems in which several servo drives in a more complex system each have a separate logic. To reset the drive characteristic, new parameters can be loaded from the outside.

U.S. Pat. No. 4,568,866 teaches a method for controlling stepping motors in which ramp data are loaded into stepping motor modules in advance. A plurality of modules that are supported by microprocessors work in conjunction with one another in such a way that different stepping motors can be actuated at the same time. The ramp data are calculated centrally in computer and transferred via a bus system to the modules for actuating the stepping motors.

SUMMARY OF THE INVENTION

It is an object of the invention to propose a method and a device for controlling a stepping motor module which has high flexibility and which guarantees, under real time conditions, that the required acceleration and delay ramps are precisely followed.

According to the invention, a method is put forward for controlling at least one stepping motor of a stepping motor module, in which a power unit of the stepping motor module supplies at least one stepping motor with power, with the stepping motor advancing one step with each current impulse. The power unit receives impulses from a logic assembly, whose respective edge generates a current impulse and whose respective interval relative to the previous impulse is computed from a set of ramp data. The logic assembly reads ramp data that follow upon one another at definite time intervals in order to define the pulsewidth of the respective pulsewidth modulated pulse. In the logic unit, several sets of ramp data are made available. The sets of ramp data are computed in advance centrally in a computer and are transferred via a bus system to the logic assembly in a loading phase prior to the operation of the stepping motor. The current set of ramp data are communicated to the stepping motor module during the operation of a control unit via the bus system. The conversion of the set of ramp data that is selected in the logic assembly into impulses with a variable interval is started by a start signal.

In the invention the sets of ramp data which define the rising ramp in the acceleration of the stepping motor and the trailing ramp in the braking of the stepping motor are calculated in a computer during the loading phase; that is, outside the scope of the actual operating of the stepping motor module. The rules and parameters for this calculation are predetermined by characteristic attributes of the stepping motor, on the one hand, and by the respective characteristics that are desired in the application, on the other hand.

Calculation formulas for calculating the ramp data are prescribed on a motor-specific basis. The sets of ramp data that are obtained by the calculation are transferred to the respective logic assembly via a bus system and stored there. Because the calculation occurs outside the scope of the actual operation phase, there is sufficient time to be able to use complex and accordingly precise formulas.

With the invention, it is possible in particular to store all computed sets of ramp data decentrally—that is, in the individual stepping motor modules—once, in a non-volatile memory, and to use these data as needed depending on the operation. In particular, it can be provided that the currently needed data be loaded from the non-volatile memory into a volatile main memory, the access time of the volatile memory in the operation being appreciably shorter than that of the non-volatile memory. This makes it possible to control the stepping motor, a plurality of stepping motors, in real time.

During the operation of the stepping motor module, the logic assembly can be informed of the current ramp data—i.e. that which is being required—by the device control unit, namely via the bus system. This set of ramp data then stipulates the speed/time curve of the stepping motor. The transfer via the bus system of a logical name or a characteristic digit for the set of ramp data that are to be selected is not time-critical and can be performed in the real-time operation, even given simple bus systems and interface systems.

According to the invention, an additional start signal is sent to the logic assembly, whereupon the conversion of the ramp data into pulsewidth modulated impulses is begun. In this way, the transmission of the logical name of the selected set of ramp data and the actual start process for modifying the rate of rotation of the stepping motor are decoupled with respect to time. For instance, in several stepping motor modules the sets of ramp data that are needed for a particular motion sequence of the stepping motors can be designated in that the required sets of ramp data are communicated in a data transfer process which is shifted in time and is thus not time-critical. The time-critical start signal, which can be transferred without a large data transmission expense and thus in a short time window, is output only at a later time, and the conversion of the ramp data is begun.

For time-critical applications, the start signal is transferred via a separate line which is separate from the bus system. This way, the reaction time of the bus system and its usage are unimportant. Rather, several stepping motor modules can receive the start signal exactly at the same time, so that identical speed/time curves can be followed by several step motors simultaneously.

According to another aspect of the invention, a device for controlling at least one stepping motor module is laid out as claimed in claim 10. This device has the beneficial effects already described for the method.

Exemplifying embodiments of the invention will now be detailed with the aid of the drawing.

DESCRIPTION OF THE PREFERRED EMBODIMENTS

Figure 1:
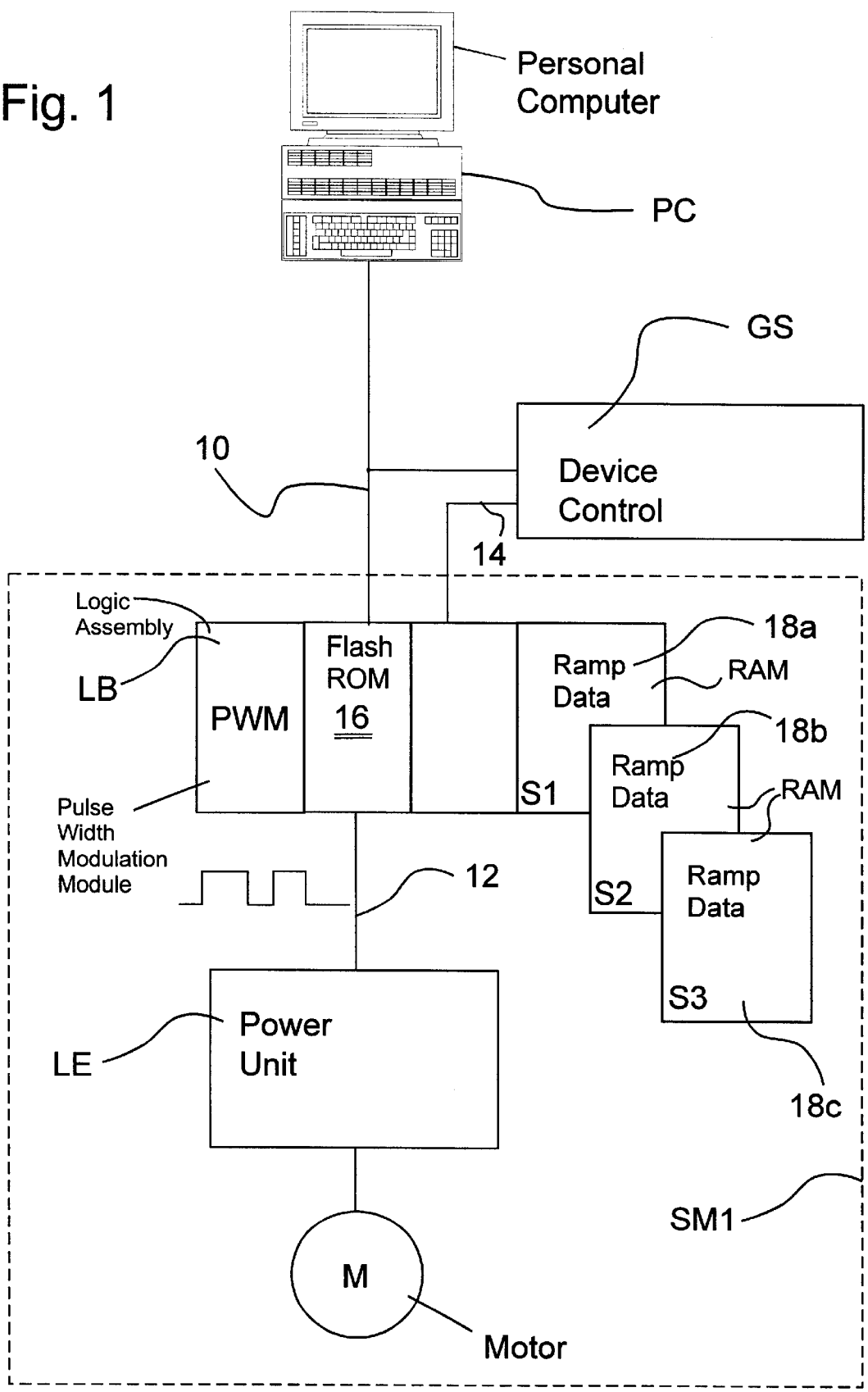
FIG. 1 is a stepping motor module whose logic assembly is loaded with sets of ramp data by an external personal computer.

FIG. 1 is a schematic of the structure of a stepping motor module SM1 which is connected to a personal computer PC and a device control GS via a data bus 10. The device control GS controls an electrographic highspeed printer 1 containing a plurality of stepping motor modules in the fashion of the stepping motor module SM1, an electrophotographic developing station ES, a fixing station FS and diverse other components such as switch controllers WS. These components can be connected to the device control GS directly (see FIG. 4) or can be connected to the device control GS via the shared bus system 10. Further details of the printer 1 are described in WO 98/18060 A1, the contents of which are hereby incorporated into the present specification by reference.

The stepping motors belonging to the respective stepping motor modules SM1, SM2, SM3 drive transport drums, which transport individual pages through the printer or copier. Within the printer, photoelectric barriers that are coupled to the stepping motor modules SM1, SM2, SM3 trigger the ramp operation of the corresponding motors.

A stepping motor module (SM1) contains a logic assembly LB and a main memory in which sets S1, S2, S3 of ramp data can be stored. The logic assembly LB further contains a pulsewidth modulation module PWM, which contains a microprocessor that assumes the control functions for the logic assembly. From the ramp data of the sets S1, S2, S3, the module PWM creates impulses with a variable interval relative to the preceding impulse, which are fed to a power unit LE via the line 12. The impulse intervals are computed from the ramp data. These ramp data correspond to time values.

From the rising edge of the interval modulated pulse, the power unit LE generates a current impulse, which it feeds to the stepping motor M. With every current impulse the stepping motor M is advanced one rotational step.

The logic assembly LB is designed in such a way that the value defining the impulse interval that was last read out from a set S1, S2, S3 of ramp data is retained until new ramp data are read out. Accordingly, given the constant pulse interval the rotational speed of the stepping motor M remains constant. To modify the rotary frequency of the stepping motor M, the logic assembly LB accesses a selected set S1, S2, S3 of ramp data. The ramp data of the selected set are read out at predetermined time intervals that are acquired from the clock signal of the microprocessor that controls the logic assembly, and the impulse interval for the present interval-modulated impulse is determined from said data. The next impulse is acquired from the next item of ramp data of the same set after the time interval has elapsed. The set of ramp data contains an item of ramp data for every step of a rising or falling ramp. For example, if a ramp comprises 500 rotational steps, the related set of ramp data contains 500 items. Given a rising ramp ( i.e., the rotational speed of the stepping motor M is being changed from a low value to a high value), the interval of the pulses emitted by the logic assembly LB diminishes continuously. Given a falling ramp, the pulse interval grows larger. As described, the pulse interval corresponding to the last item of ramp data of the selected set S1, S2, S3 is retained; that is, the rotary frequency of the stepping motor M remains constant.

The device control GS is additionally connected to the logic assembly LB via an additional line 14 which is led separately from the data bus 10. Via this line 14 a start signal is outputted by the device control GS in order to start the conversion of the set of ramp data that has been selected in the logic assembly into interval modulated pulses.

Figure 2:
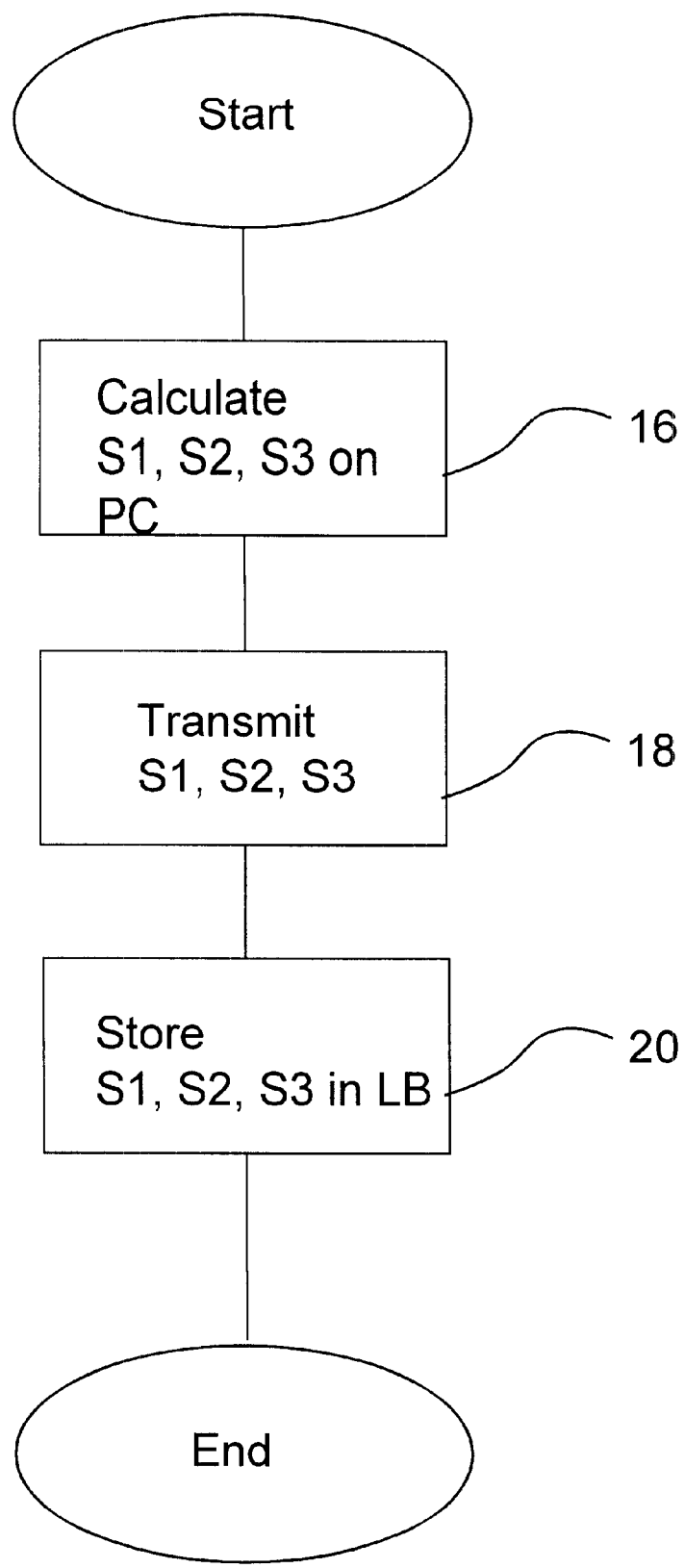
FIG. 2 is a flowchart with steps that run during the initializing phase.

The steps that are performed prior to a printing phase using the device illustrated in FIG. 1 will now be described with the aid of the flowchart in FIG. 2.

In step 16 separate sets S1, S2, S3 of ramp for the various stepping motors of the printer data are computed on the personal computer in a calculation phase. To do this, reference is made to manufacturer specifications for the stepping motors M and to prescribed calculation formulas. Besides these, the desired movement sequence is taken into account in this calculation of the sets S1, S2, S3; that is, the necessary speed, the acceleration, and the delay of the stepping motors M. Complex formulas can be used to compute the sets S1, S2, S3, since there is sufficient time available during the calculation phase. After the calculation of the sets S1, S2, S3, the ramp data are transferred via the data bus 10 into a non-volatile, recordable, readable and erasable electronics memory 16, for instance into an EEPROM or a flash ROM of the logic assembly LB, in a loading phase (step 18).

After the start of the printer, in an initializing phase (step 20) the ramp data sets S1, S2, S3 are loaded from the memory 16 into corresponding memory areas of the main memory (RAM) 18a, 18b, 18c of the respective logic assembly LB. There, these sets are available during the print operation. As is known, the main memory (RAM) has a shorter access time than the non-volatile memory 16, thus enabling a real-time operation. Depending on the instance of application, a large number of ramp data sets can be stored in each logic assembly LB.

Figure 3:
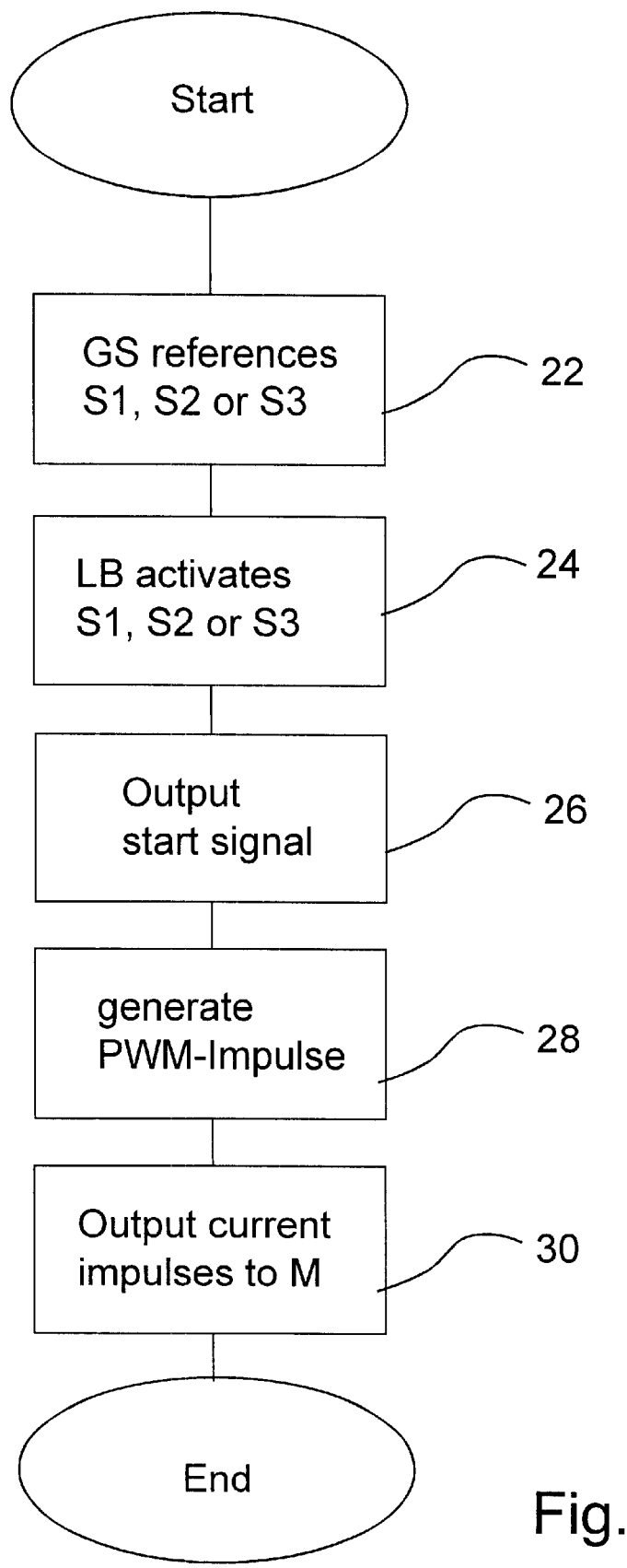
FIG. 3 is a flowchart with steps that are passed through during the actual operating of the stepping motor module.

The steps for controlling the stepping motor M during the print operation will now be described with the aid of the flowchart according to FIG. 3. According to the desired transport of individual pages or the continuous paper web in the printer, the device control GS gives information to the logic assembly group LB via the data bus 10 and designates the selected set S1, S2, S3 of ramp data in order to carry out a specific modification to the rotary frequency of the stepping motor M (step 22). In the following step 24, the logic assembly LB activates the designated set of ramp data. When the additional stepping motor modules of the printer are also supplied with corresponding information via the selected sets of ramp data, and a predetermined process state is attained, the device control GS sends out the start signal via the line 14, whereupon the logic assembly of the stepping motor module SM1, or respectively, the logic assemblies of the additional stepping motor modules, send out impulses at a variable interval based on the ramp data of the selected set (step 26 and step 28). Given rising pulse edges, the respective power unit LE generates a current pulse that is adapted to the stepping motor M, in order to move the stepping motor M one step further in the desired direction. By virtue of the start signals being delivered to several stepping motor modules simultaneously, all the contributing stepping motors have the same speed of rotation at any given time, whereby the paper transport in the printer is accomplished very evenly and without tension. Delay times which can arise in the transfer of data on the data bus 10 do not play a role in this type of arrangement and execution of the method.

Figure 4:
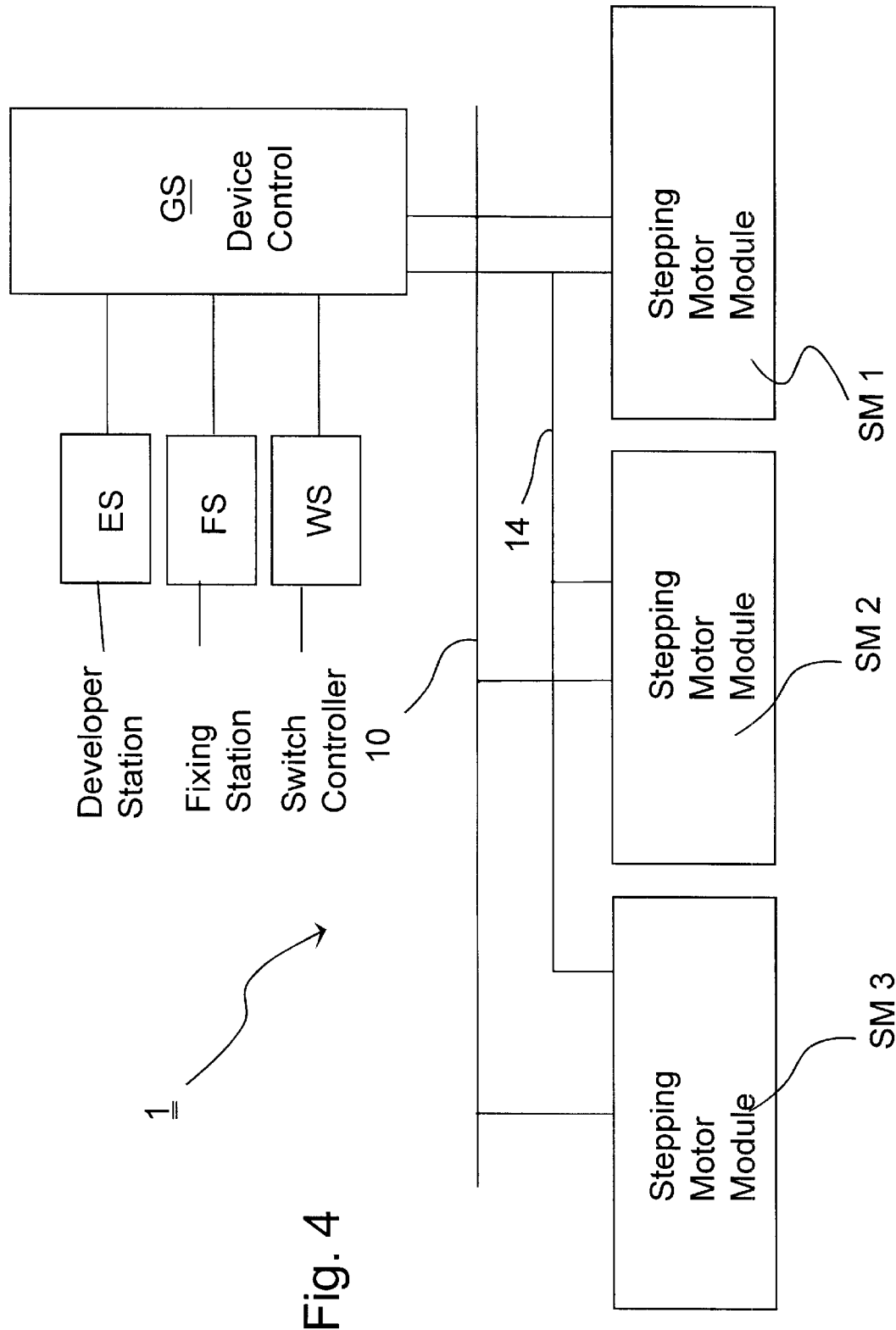
FIG. 4 is a schematic of the arrangement of several stepping motor modules with a device control.

FIG. 4 shows a schematic of the arrangement of several stepping motor modules SM1, SM2, SM3 which are connected to the device control unit GS. During the initializing phase, this device control unit GS transfers the sets of ramp data that are required for the stepping motor modules SM1, SM2, SM3 via the data bus 10. During the operation under real-time conditions, information designating the sets that are required for a particular movement sequence is transferred via this data bus 10. A common start signal is transmitted simultaneously to all stepping motor modules SM1, SM2, SM3 that contribute to the paper transport in the printer via the line 14, which is separate from the data bus 10, so that the stepping motor modules SM1, SM2, SM3 execute a modification of the rotary frequency of the stepping motors they control.

Figure 5:
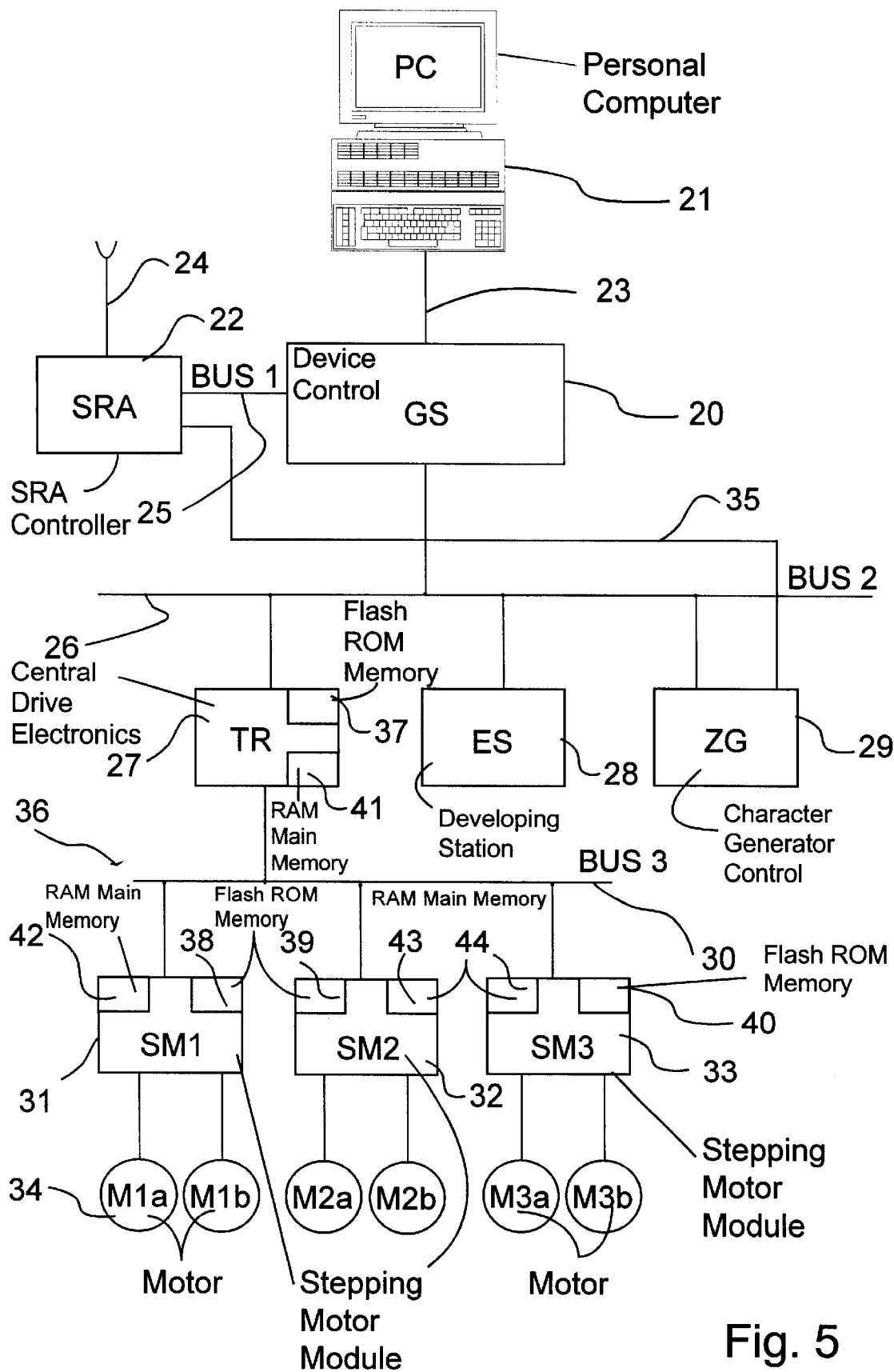
FIG. 5 is an arrangement of several stepping motor modules with a device control in an electrographic printer.

FIG. 5 shows another arrangement of stepping motor modules in an electrographic device. This Figure highlights the bus structure via which the various components of the electrographic device are connected to one another. The device control 20 is the central component. It is connected to a raster processor 22 via a first SDLC bus 25, which, on its part, receives printing data from a printing data source such as a host computer via a connecting line 24. These printing data are screened in the raster processor 22 and sent via a separate line 35 to the electronics 29 of a character generator, which converts these signals into optical exposure impulses for exposing an electrophotographic unit, for instance a photoconductive drum or a photoconductive strip.

Details of this type of raster processor 22 are known from WO 96/09611 A1, for example. A corresponding character generator is known from WO 96/37862 A1, for example. The contents of these two WO publications are hereby incorporated into the present specification by reference.

The printing data line 35 guarantees that in a running printing operation the printing data can be transmitted from the SRA controller 22 (SRA means scalable raster architecture) into the controller 39 of the character generator at a high level of performance. This decoupling of the printing data transfer from the transfer of other control data of the printing device, which takes place via the bus systems 25, 26, or respectively, 30, guarantees a high printing speed.

The device control 20 exchanges control data with other device components via the SDLC bus 25, on one hand, and via the SDLC bus 26, on the other hand. Besides the device control 20, electronics 36 for controlling the drives, electronics 28 for controlling an electrographic developing station, and the electronics 29 for controlling the character generator are connected to the bus 26.

The control unit 36 for the drives comprises a central drive electronics 27 as well as a CAN bus 30 via which the central drive electronics 27 is connected to the various stepping motor modules 31, 32 and 33. One or more stepping motors M1a, M1b, M2a, M2b, M3a, M3b are connected to each of the stepping motor modules, in turn. The stepping motor modules 31, 32, 33 are identical to the stepping motor module SM1 represented in FIG. 1 with regard to the logic assembly, the pulsewidth modulation module, and the power unit.

The control data of the printer of FIG. 5 can be calculated and loaded in a similar manner as in the exemplifying embodiment described in connection with FIG. 2. First, suitable sets S1, S2, S3 of ramp data for the various stepping motors of the printer are calculated on the personal computer 21. In this process, manufacturer's specifications for the stepping motors M1a, M1b, M2a, and so on, as well as prescribed calculation formulas are applied, and the respectively desired movement sequence—i.e. the required speed, acceleration and delay of the stepping motors M1a, etc., are taken into account. After the calculation of the ramp data sets S1, S2, S3, the ramp data are transferred via the V24 interface 23 into a non-volatile, readable and recordable memory (flash ROM) of the device control 20.

The ramp data sets are stored not only in a flash ROM of the device control unit 20, but also in a corresponding non-volatile memory 37 of the central drive control 27. The central drive control 27 routes these data to the stepping motor modules 31, 32, and 33, in turn, which likewise store the data in separate flash ROM memories 38, 39, and 40. The device control unit 20 and the central drive module 27 assume a relay function for transferring the ramp data to the stepping motor modules 31, 32, 33.

With this variant of data storage, a redundancy is created, which makes it possible to maintain a printing operation even if a memory in one of the assemblies should fail, in that the corresponding data from the memory of another (particularly the central) drive control 27, are loaded into the stepping motor modules 31, 32, or respectively, 33.

A simplified redundancy is possible when the ramp data of all stepping motors of all modules are stored in only one flash ROM memory of the printing device, for instance in the device control 20 or in the central drive control 27, and for each stepping motor module only the ramp data sets belonging to this module are stored.

With the starting of the printer, in an initializing phase the ramp data in the flash ROM memories 37, 38, 39, 40 are loaded into corresponding main memories (RAM) 41, 42, 43, 44 of the appertaining components 27, 31, 32, and 33. There, these ramp data sets are available during the print operation.

In particular, the invention makes it possible to load only ramp data sets that are currently needed into the main memory and to update the ramp data sets in the main memory during the print operation depending on operating conditions of the device; that is, to load these from the flash ROM into the main memory. This makes it possible to keep the size of the main memory in the stepping motor modules within economical limits. For instance, various printing speeds in various printing modes, such as a simplex printing mode or a duplex printing mode, can be provided in the print operation, and different sets of ramp data may be required in the stepping motor modules, accordingly.

During the print operation, an item of information (code) from which the respectively required sets of ramp data derive is transferred by the device control 20 or the central drive control 27 to the stepping motor modules 31, 32, 33 via the bus system 30. In the individual stepping motor modules 31, 32, 33, the respectively allocated ramp data sets can be accessed in real time via their main memories 42, 43, 44 in that the start signal is transferred by the device control or the central drive module 27 to the stepping motor module 31, 32, 33 via a separate line similar to the line 14 in FIG. 1.

Although the invention has been described in the example of a highspeed printer that transports individual pages, it is also applicable to copiers and devices in which other materials, for instance documents or web type recording media, are transported using stepping motors.

Although various minor changes and modifications might be proposed by those skilled in the art, it will be understood that our wish is to include within the claims of the patent warranted hereon all such changes and modifications as reasonably come within our contribution to the art.

What is claimed is:

1. A method for operating a plurality of stepping motor modules in a printer or copier, comprising the steps of:
   with each power unit of the stepping motor modules supplying at least one stepping motor with current impulses, the stepping motor being advanced one step by each current impulse;
   with the power unit, receiving impulses that are spaced apart from one another in time from a logic assembly of the respective stepping motor module, each edge of the pulses generating a current impulse in the power unit, an interval of the current impulse being calculated from a set of ramp data, whereby, to fix the interval of the respective impulse, the logic assembly reading out items of ramp data that follow one another at predetermined time intervals;
   making available several sets of ramp data in each logic assembly;
   in a loading phase, calculating the sets of ramp data centrally in a computer and transferring them via a bus system to the logic assembly;
   during operation of the stepping motor module, communicating a current set of ramp data to the logic assembly by a control via the bus system;
   starting conversion of the set of ramp data that has been selected in the logic assembly into impulses with a variable interval by a start signal; and
   transferring the start signal to the logic assembly via a separate line that is separate from the bus system.

2. The method of claim 1 wherein ramp data sets are transferred in an initializing phase at the start of the printing operation from a non-volatile memory to a volatile memory of the logic assembly.

3. The method of claim 1 wherein the power unit generates a current pulse from a rising edge of the impulse.

4. The method of claim 1 wherein a personal computer that is operated by an operator is used as the central computer.

5. The method of claim 1 wherein the stepping motor modules are used for the transport of carrier material.

6. The method of claim 5 wherein for the print operation, the device control of the printer selects the current set of ramp data for each stepping motor module, and the conversion of the selected sets of ramp data into impulses with a variable interval is started by a common start signal for a plurality of the stepping motor modules.

7. The method of claim 1 wherein each set of ramp data contains a number of items which, in succession, indicate the interval between successive impulses of a rising ramp speed or a falling ramp speed of the stepping motor.

8. The method of claim 1 wherein the respective logic assembly maintains the pulse interval of the last output item from a set of ramp data until a new set of ramp data is selected and the conversion of the ramp data into pulse intervals for the pulses is started.

9. The method of claim 1 wherein during the operation of the stepping motor module, a new set of ramp data is transferred by a control to the logic assembly via the bus system.

10. A device for controlling a plurality of stepping motor modules in a printer or copier, comprising:
    a plurality of power units, each of which supplies at least one stepping motor with current impulses, the stepping motor being advanced one step by each current impulse;
    each of the power units receiving impulses spaced apart from one another in time from a respective logic assembly, each edge of the impulses generating a current impulse in the power unit, and an interval of the impulses relative to a previous impulse being calculated from a set of ramp data, whereby, to fix an interval of the respective impulse, the logic assembly reads out ramp data that follow one another at predetermined time intervals;
    several sets of ramp data are in a memory of the logic assembly;
    a bus system with which the sets of ramp data that are computed by a computer are transmitted to the logic assembly;
    during the operation of the stepping motor module the current set of ramp data is communicated to the logic assembly by a control via the bus system;
    a conversion of the set of ramp data that has been selected in the logic assembly into impulses with a variable interval is started by a start signal; and
    a line separate from the bus system which carries the start signal.

11. The device of claim 10 wherein each logic assembly comprises a non-volatile memory and a volatile main memory for the ramp data sets.

12. The device of claim 11 with a control which allocates ramp data sets to the stepping motor modules depending on operating conditions of a device and which effectuates loading of the ramp data sets that have been allocated to the stepping motor modules into their respective main memories.

13. The device of claim 10 wherein the power unit generates a current pulse from a rising edge of the impulse.

14. The device of claim 10 wherein for a printer or copier it is provided with a plurality of stepping motor modules for the transport of carrier material.

15. The device of claim 14 wherein a device control of the printer or copier in operation selects the current set of ramp data for each stepping motor module, and the conversion of the selected set of ramp data into impulses with a variable interval is started by a common start signal for a plurality of the stepping motor modules.

16. A method for operating a plurality of stepping motor modules in a printer or copier, comprising the steps of:

with each power unit of the stepping motor modules supplying at least one stepping motor with current impulses;

with the power unit, receiving impulses that are spaced apart from one another from a logic assembly of the respective stepping motor module, each edge of the pulses generating a current impulse in the power unit, an interval of the current impulse being calculated from a set of ramp data, whereby, to fix the interval of the respective impulse, the logic assembly reading out items of ramp data that follow one another at predetermined time intervals;

making available several sets of ramp data in each logic assembly;

in a loading phase, calculating the sets of ramp data in a computer and transferring them to the logic assembly;

during operation of the stepping motor module, communicating a current set of ramp data to the logic assembly;

starting conversion of the set of ramp data that has been selected in the logic assembly into impulses with a variable interval by a start signal; and transferring the start signal to the logic assembly.

* * * * *